April 3, 1945.   D. W. SHERMAN   2,372,744
AUTOMOBILE FRONT WHEEL SUSPENSION
Filed July 28, 1941
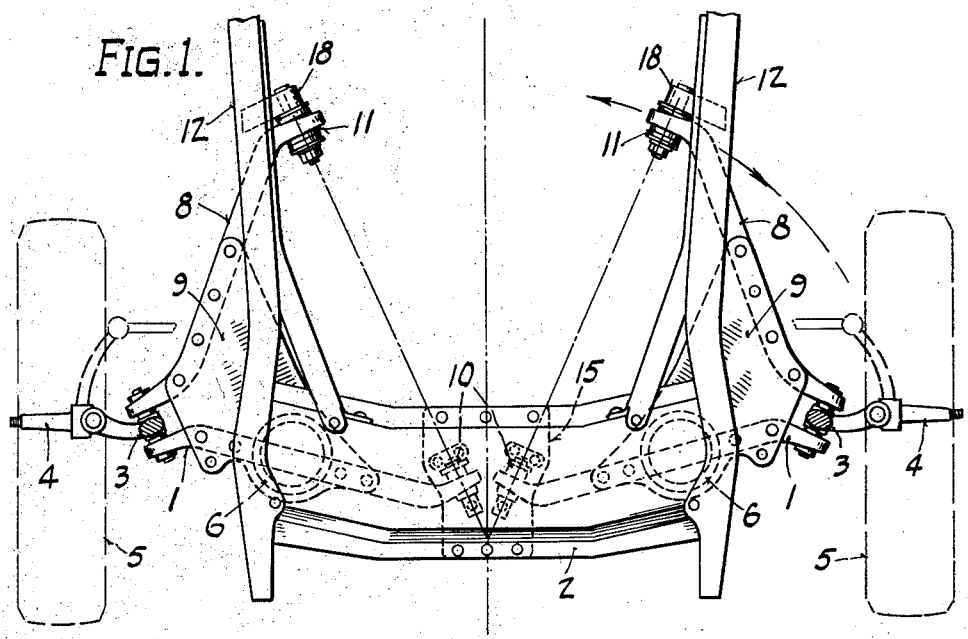
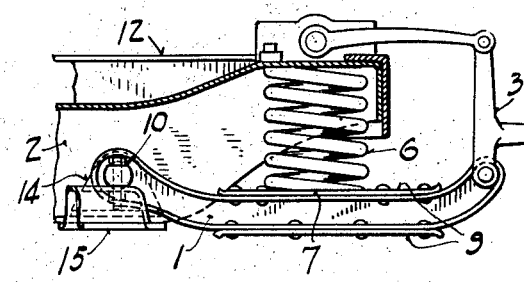
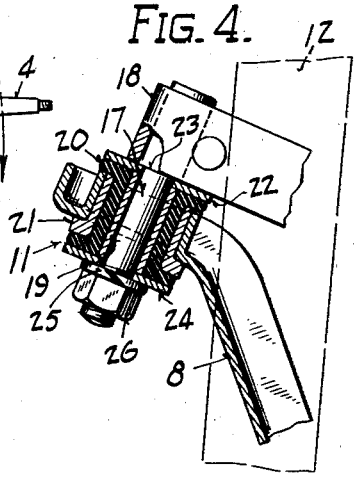
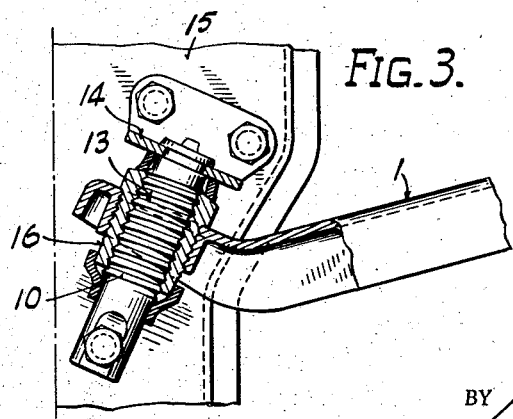
Donald W. Sherman
INVENTOR.
BY *Elwin A. Andrus*
ATTORNEY.

Patented Apr. 3, 1945

2,372,744

UNITED STATES PATENT OFFICE 2,372,744

AUTOMOBILE FRONT WHEEL SUSPENSION

Donald W. Sherman, Shorewood, Wis., assignor to A. O. Smith Corporation, Milwaukee, Wis., a corporation of New York Application July 28, 1941, Serial No. 404,370

1 Claim. (Cl. 267—20)

This invention relates to automobile front wheel suspension and more particularly to an improved type of independent coil spring suspension for the front wheel.

The object of the invention is to provide a stronger and less expensive suspension for the forward wheels of an automobile.

Another object is to provide a suspension with better cushioning characteristics and having adequate dampening effect.

An embodiment of the invention is illustrated in the accompanying drawing in which:

Figure 1 is a plan view of the forward end of the chassis of an automobile showing the front wheel suspension;

Fig. 2 is a front elevational view, partly in section, taken in the direction of the axis of the wheel supporting arms;

Figs. 3 is a longitudinal section through the forward bearing of the suspension; and Fig. 4 is a longitudinal section through the rear bearing of the suspension.

The wheel suspension is of the independent coil spring type employing an arm 1 pivoted at or near the center of the front cross bar 2 of the chassis frame and having its outer end horizontally pivoted to the steering knuckle arm 3 to which is vertically pivoted the stub axle 4 of the road wheel 5.

A coil spring 6 rests on a seat 7 near the center of arm 1 and serves to support the chassis frame at the end of cross bar 2.

Heretofore, this type of mounting has employed a rubber bearing at the inner front pivot between arm 1 and cross bar 2 and a straight torque arm extending back to a rubber socket which allows flexing of the torque arm. The rear socket had to withstand substantial thrust forces and was expensive to construct. The torque arm functioned to carry part of the vertical load.

The present invention employs a rear arm 8 secured rigidly to the forward arm 1 by horizontal gusset plates 9 the upper one of which is shaped to provide the spring seat 7.

The steering knuckle 3 is pivoted between the outer end of arm 1 and the forward end of arm 8 on an axis parallel to the axis of the pivoted bearing 10 between the inner end of arm 1 and cross bar 2.

The rear end of arm 8 is pivoted in a rubber bearing 11 on a bracket secured to the side frame member 12 of the chassis, the bearing 11 being axially aligned with bearing 10.

The bearing 10 has a central threaded pin 13 secured rigidly in a bracket 14 which is in turn secured to a plate 15 on the underside of the cross bar 2. A flanged sleeve 16 is threaded onto pin 13 and has an external thread for threading securely into the flanged end of the arm 1.

The bearing 11 has a central pin 17 secured rigidly in a bracket 18 on the underside of frame member 12. A spacer sleeve 19 on pin 17 carries the spool shaped rubber bearing member 20 on which a second metal sleeve 21 is mounted and the latter is received in the flanged end of arm 8. A washer 22 is interposed between a shoulder 23 on pin 17 and the inner ends of sleeve 19 and rubber bushing 20. A washer 24 is provided at the outer ends of sleeve 19 and bushing 20 and the entire assembly is secured in place against the shoulder 23 by lock washer 25 and nut 26 which is threaded onto the end of pin 17.

The spring 6 is located approximately at the center of arm 1 and is on a straight line between the center of bearing 10 and the center of the road wheel 5.

The distance between the center of the bearing 10 and the center of bearing 11 may be approximately equal to the distance between the center of bearing 10 and the center of the road wheel 5. Thus, in service the bearing 10 carries the entire spring reaction or vertical load and the bearing 11 carries no static load. The bearing 11, as shown in Figure 1, is in effect located at the circumference of a circle passing through the center of the wheel 5 and struck with the bearing 10 as its center but the bearing 11 may be at a smaller or greater radial distance from bearing 10. With this construction bearing 11 is subjected only to lateral forces transverse to its axis, caused by the fore and aft loading of road wheel 5.

Were the arm 8 flexible like the arms employed in previous constructions, the bearing 11 could not be constructed as shown, but it would be subjected to forces in several directions, including major forces longitudinal to the arm. In the present construction these are substantially eliminated by the rigid tie between arms 1 and 8 and by employing a rigid bearing 10 and a cushioned bearing 11 capable of allowing limited pivotal horizontal movement of the suspension about bearing 10 as a center.

The vertical loads on wheel 5 are taken by bearing 10 and the fore and aft loads on wheel 5 are taken by bearing 11. There is sufficient give or looseness in bearing 10 to accommodate the very limited movement resulting when the rubber sleeve 20 of bearing 11 is compressed on either side Each bearing is constructed in accordance with the requirements of its function. The bearing 10 is of the metal frictional type and has the advantage of providing substantial dampening to vertical movements of the wheel. The bearing 11 can be constructed with relatively soft rubber to provide for the desired slight fore and aft movement of the wheel which tends to eliminate kick-back in the steering wheel from road shocks.

The invention may have various embodiments within the scope of the accompanying claim.

I claim:

An automobile front wheel suspension comprising a pair of diverging arms having their far ends pivoted in aligned bearings to the chassis frame and their near ends pivoted to the road wheel mounting to provide for free pivotal movement thereof under vertical loads on the road wheel, a transverse plate tying said arms rigidly together to prevent relative lateral flexing of the same, the forward arm extending substantially transverse to the chassis frame and having a rigid pivotal connection therewith, the pivot bearing for said rear arm being disposed substantially the same distance from said rigid forward arm pivot bearing as the center of the road wheel and providing a cushion to allow limited oscillation of the arms under fore and aft loads on the road wheel with said forward pivot bearing as a center, and a spring for vertically supporting the chassis upon said forward arm while leaving said rear arm substantially free of vertical load.

DONALD W. SHERMAN.